No. 755,920. PATENTED MAR. 29, 1904.
F. W. OLIN.
SHELL HEAD FEEDING APPARATUS.
APPLICATION FILED FEB. 24, 1903.
NO MODEL.
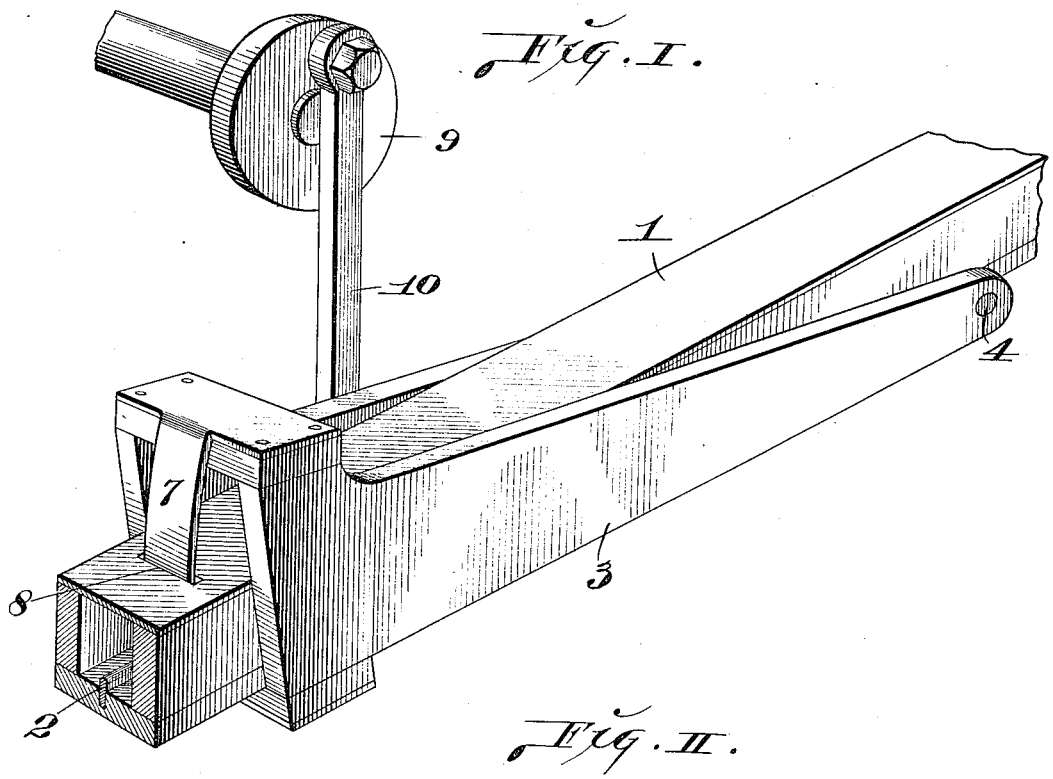
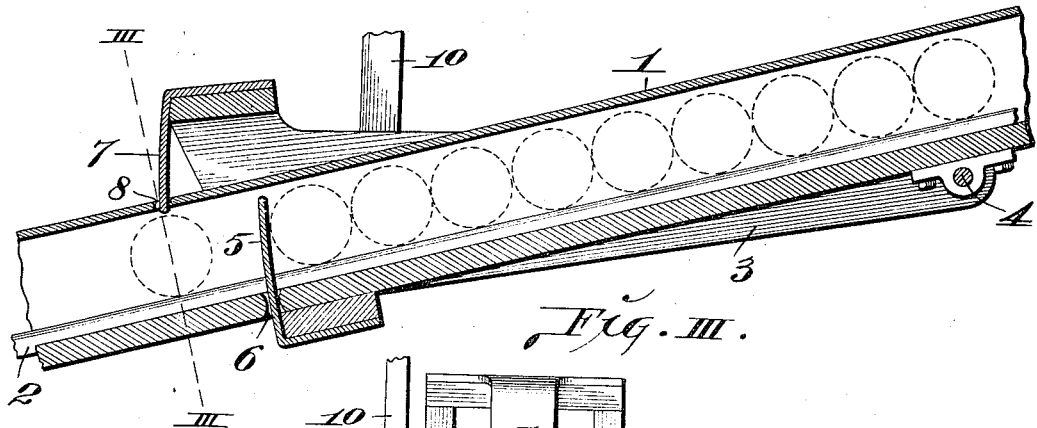
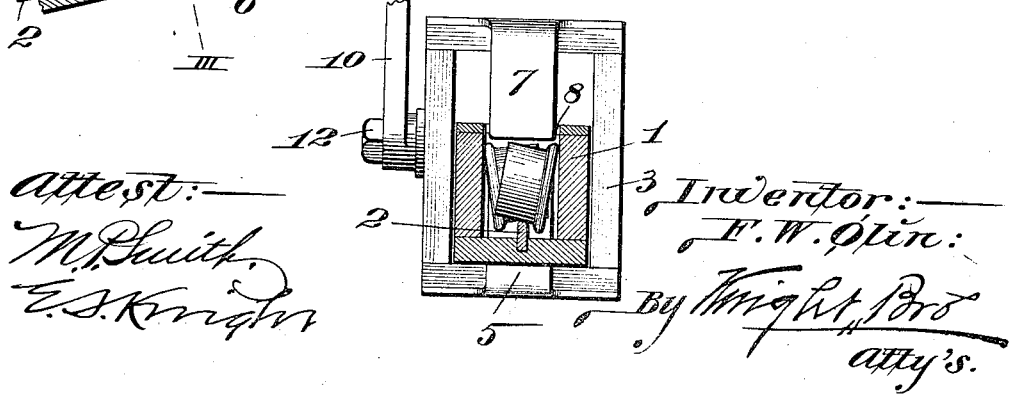

No. 755,920. Patented March 29, 1904.

UNITED STATES PATENT OFFICE.

FRANKLIN W. OLIN, OF ALTON, ILLINOIS.

SHELL-HEAD-FEEDING APPARATUS.

SPECIFICATION forming part of Letters Patent No. 755,920, dated March 29, 1904.

Application filed February 24, 1903. Serial No. 144,647. (No model.)

*To all whom it may concern:*

Be it known that I, FRANKLIN W. OLIN, a citizen of the United States, residing at Alton, in the county of Madison and State of Illinois, have invented certain new and useful Improvements in Shell-Head-Feeding Apparatus, of which the following is a full, clear, and exact description, reference being had to the accompanying drawings, forming part of this specification.

My invention relates to a machine for feeding right end up the metallic heads of shells, the machine being so constructed that all of the heads will be fed open end up to the delivery-chute.

My present invention relates particularly to an apparatus or device which will feed the shell-heads intermittently or one at a time, so that they will be delivered separately to the conveying-chute and at a speed that can be regulated to suit other conditions.

My invention consists in features of novelty hereinafter fully described, and pointed out in the claim.

Figure I is a perspective view illustrative of my invention. Fig. II is a longitudinal section. Fig. III is a transverse section taken on line III III, Fig. II.

Referring to the drawings, 1 represents a trough into which the shells are deposited manually or by any suitable form of feeder. Centrally located in the bottom of the trough is a raised rib 2, down which the shell-heads roll by gravity, the trough being arranged in an inclined position, as seen in Fig. II. The shell-heads are placed in the trough without regard to which side of the trough the beaded end of the shell may be presented, and as they roll down the trough riding on the rib, as shown in Fig. III, their beaded ends will tilt toward their side of the trough, as shown in Fig. III, the result being that when the heads leave the trough and pass onto the chute (which may be of any desired form and which is not shown) they will land bead end down and open end up, and this will be the case no matter to which side of the trough the beaded end of the head is presented.

In order to have the heads feed intermittently or one at a time and to further insure their beaded ends hugging the sides of the trough toward which they are presented, I provide a cut-off consisting of an arm or arms 3, that are pivoted at 4 to the trough or other suitable support and which carry a lower cut-off blade 5, working in a slot 6 in the bottom of the trough, and an upper cut-off blade 7, working in a slot 8 in the top of the trough. The arm or arms (I have shown two, but it is evident that one only might be used) have a vertical oscillation imparted to them by any suitable form of mechanism—such, for instance, as a revolving disk 9 to which is connected eccentrically one end of a link 10, the other end of which is made fast at 12 to one of the arms 3. As the cut-off thus moves downwardly, one of the shell-heads will move into the space between the two blades 5 and 7, and when the cut-off is raised the blade 5 will hold back the other heads, while the blade 7 will allow the head that has passed into the space between the two blades to escape and move down the trough by itself, and as it passes under the lower end of the blade 7 it will have its head end twisted still farther over against the wall of the trough toward which it is presented by virtue of the fact of its bead (being at one end of the head and being the only part of the head that is in contact with the lower end of the blade) bearing in frictional contact with the lower end of the blade, and when the shell-heads have been thus once shifted over with their bead ends against the side of the trough to which they are presented they will continue to hug this side of the trough as they roll down the rib 2, and thus the certainty of their falling onto the delivery-chute open end up is assured, and they are delivered to the chute 1 one at a time and with such speed as may be required or desirable, the speed being regulated by timing the movement of the cut-off 3.

I claim as my invention—

In a shell-head-feeding apparatus, the combination of a trough having a longitudinal rib extending upwardly from the bottom thereof on which the shell-heads ride, and a cut-off having upper and lower blades working in slots formed in the top and bottom of the trough, and means for imparting movement to the arm; the upper blade being so disposed as to bear against the beads on the shell-heads as they pass thereunder, substantially as set forth.

FRANKLIN W. OLIN.

In presence of—
E. S. KNIGHT,
M. P. SMITH.